United States Patent
Miyahara et al.

(10) Patent No.: US 8,899,468 B2
(45) Date of Patent: Dec. 2, 2014

(54) FRICTION STIR WELDING TOOL

(75) Inventors: Tetsuya Miyahara, Wako (JP); Mitsuru Sayama, Wako (JP); Shosuke Ohhama, Wako (JP); Daisuke Fukunaga, Wako (JP); Hiroyuki Matsufuji, Fujisawa (JP)

(73) Assignees: Honda Motor Co., Ltd., Tokyo (JP); Saga Tekkohsho Co., Ltd., Saga (JP)

( * ) Notice: Subject to any disclaimer, the term of this patent is extended or adjusted under 35 U.S.C. 154(b) by 0 days.

(21) Appl. No.: 14/239,400

(22) PCT Filed: Jun. 12, 2012

(86) PCT No.: PCT/JP2012/065003
§ 371 (c)(1),
(2), (4) Date: Feb. 18, 2014

(87) PCT Pub. No.: WO2013/027474
PCT Pub. Date: Feb. 28, 2013

(65) Prior Publication Data
US 2014/0217151 A1    Aug. 7, 2014

(30) Foreign Application Priority Data
Aug. 21, 2011   (JP) .................................. 2011-180034

(51) Int. Cl.
*B23K 20/12* (2006.01)
(52) U.S. Cl.
CPC ..................................... *B23K 20/12* (2013.01)
USPC ....................................... 228/2.1; 228/112.1
(58) Field of Classification Search
None
See application file for complete search history.

(56) References Cited

U.S. PATENT DOCUMENTS

| | | | | |
|---|---|---|---|---|
| 5,893,507 A * | 4/1999 | Ding et al. | ..................... | 228/2.1 |
| 6,758,382 B1 * | 7/2004 | Carter | ............................ | 228/2.1 |
| 7,703,656 B2 | 4/2010 | Park et al. | | |
| 2006/0043151 A1 * | 3/2006 | Stol et al. | ........................ | 228/2.1 |
| 2006/0043152 A1 * | 3/2006 | Stol et al. | ........................ | 228/2.1 |
| 2006/0081679 A1 * | 4/2006 | Sato et al. | ....................... | 228/2.1 |
| 2006/0169747 A1 * | 8/2006 | Tolle et al. | .................. | 228/112.1 |
| 2009/0003964 A1 * | 1/2009 | Keener et al. | ................. | 411/361 |
| 2009/0057377 A1 * | 3/2009 | Kashiki et al. | ............. | 228/114.5 |
| 2009/0095795 A1 * | 4/2009 | Hunt et al. | .................. | 228/112.1 |
| 2009/0236045 A1 * | 9/2009 | Burton et al. | ................. | 156/349 |
| 2009/0241301 A1 * | 10/2009 | Hunt et al. | ....................... | 24/303 |
| 2010/0108742 A1 * | 5/2010 | Stol et al. | ........................ | 228/2.1 |
| 2011/0084116 A1 * | 4/2011 | Ohashi et al. | .................. | 228/2.3 |

(Continued)

FOREIGN PATENT DOCUMENTS

| | | |
|---|---|---|
| JP | 2004-291057 A | 10/2004 |
| JP | 2005-199281 A | 7/2005 |

(Continued)

*Primary Examiner* — Kiley Stoner
(74) *Attorney, Agent, or Firm* — Carrier Blackman & Associates, P.C.; Joseph P. Carrier; William D. Blackman

(57) ABSTRACT

Disclosed is a friction stir welding tool (10) equipped with a probe (13) and a holder (16). At the tip of the probe (13) there is a pin part (11) and at the base there are probe-side protrusions (24) and probe-side recesses (25). At the tip of the holder (16) there are holder-side recesses (27) which mate with the probe-side protrusions (24), and holder-side protrusions (28) which mate with the probe-side recesses (25). External force applied to the probe (13) is transmitted from the probe-side protrusions (24) to the holder-side recesses (27) and from the probe-side recesses (25) to the holder-side protrusions (28).

4 Claims, 6 Drawing Sheets

(56) References Cited

U.S. PATENT DOCUMENTS

| | | | |
|---|---|---|---|
| 2011/0308700 A1* | 12/2011 | Burton et al. | 156/73.5 |
| 2012/0128445 A1* | 5/2012 | Hotte | 411/82 |
| 2012/0193401 A1* | 8/2012 | Hori et al. | 228/112.1 |
| 2012/0237788 A1* | 9/2012 | Fujii et al. | 428/615 |
| 2012/0325895 A1* | 12/2012 | Stol et al. | 228/112.1 |
| 2013/0037601 A1* | 2/2013 | Eller et al. | 228/112.1 |
| 2013/0134206 A1* | 5/2013 | Roos et al. | 228/2.1 |
| 2013/0186937 A1* | 7/2013 | Burton et al. | 228/2.1 |
| 2014/0123470 A1* | 5/2014 | Miles | 29/525.06 |
| 2014/0124563 A1* | 5/2014 | Obaditch et al. | 228/2.1 |
| 2014/0130736 A1* | 5/2014 | Schultz et al. | 118/600 |
| 2014/0174344 A1* | 6/2014 | Schultz et al. | 118/76 |

FOREIGN PATENT DOCUMENTS

| | | |
|---|---|---|
| JP | 2007-007685 A | 1/2007 |
| JP | 2007-268605 A | 10/2007 |
| JP | 2008-036664 A | 2/2008 |
| JP | 2008-114258 A | 5/2008 |
| JP | 2008-290133 A | 12/2008 |
| JP | 2010-247183 A | 11/2010 |
| JP | 2010-264479 A | 11/2010 |

* cited by examiner

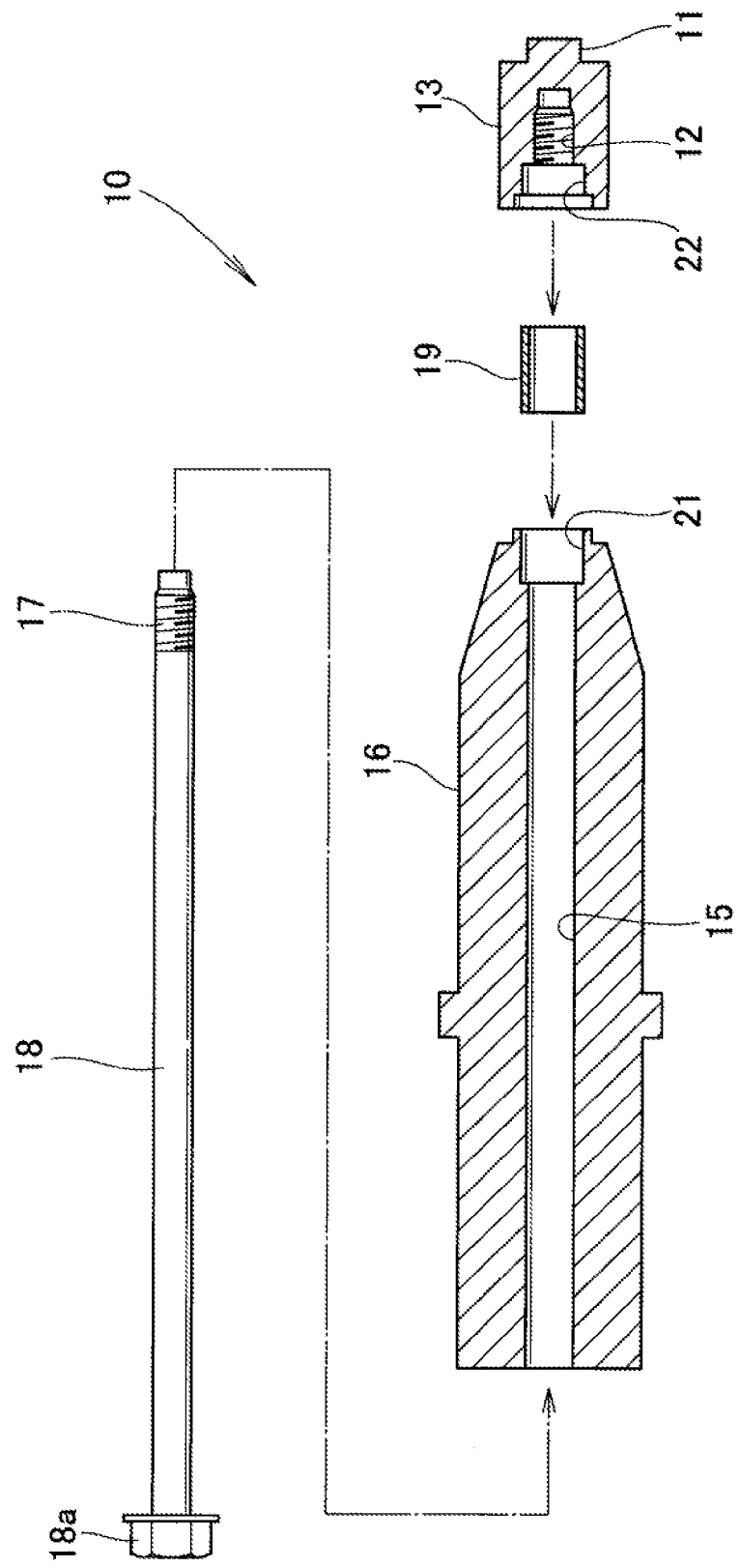

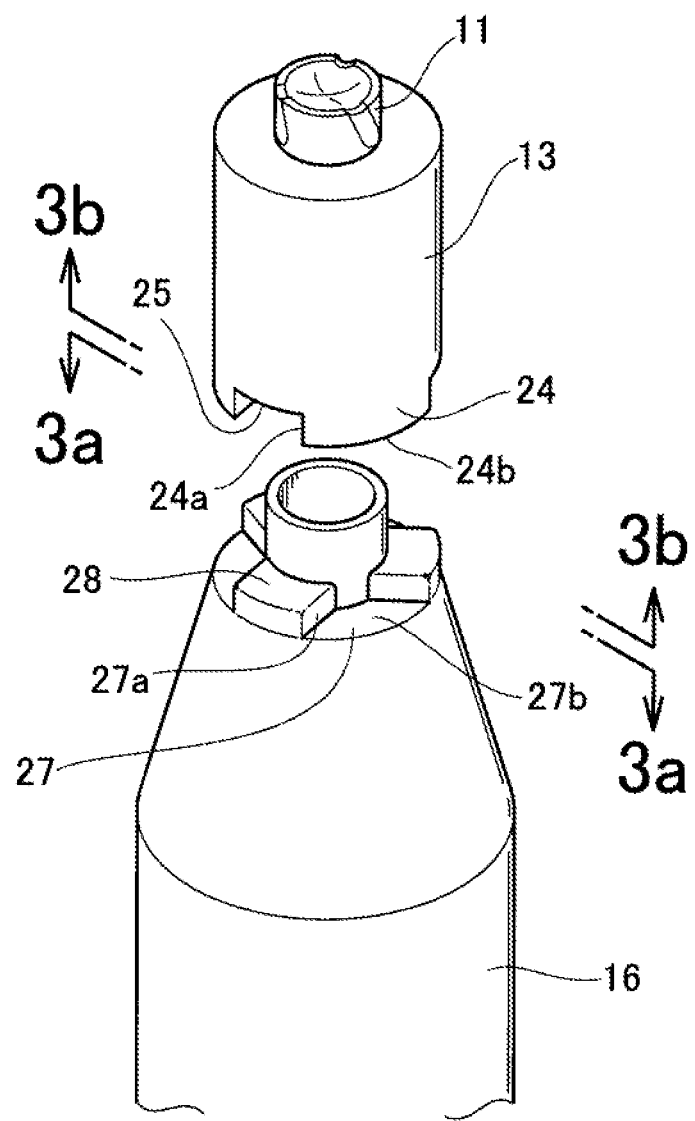

PRIOR ART

FRICTION STIR WELDING TOOL

TECHNICAL FIELD

The present invention relates to an improvement in a tool used for friction stir welding.

BACKGROUND ART

Friction stir welding is a joining method. In the friction stir welding, a pin is rotated at a high speed to generate frictional heat and cause plastic flow in materials to be joined to thereby form a homogenized weld joint. For this welding process, a tool comprised of a probe having a pin part, and a holder for holding the probe is used. The probe is consumable and has relatively high exchange frequency. The holder is therefore required to allow easy replacement of the probe.

A friction stir welding tool having a probe removably attached to a holder is known as disclosed in Patent Document 1, for example. FIG. 8 hereof shows in cross section the friction stir welding tool disclosed in Patent Document 1.

Referring now to FIG. 8, the tool 100 is constituted by a holder 102 having an axial hole 101, a probe 103 inserted in the axial hole 101 from below, and a set bolt 104 screwed into the holder 102 for setting the probe 103 with the probe 103 urged by a front end face of the set bolt 104.

When friction stir welding is to be achieved, the holder 102 is rotated at a high speed to thereby rotate the probe 103 at the same high speed. During welding, the probe 103 is subjected to external force such as minute vibration, which may cause loosening of the set bolt 104. To avoid this problem from occurring, frequent retightening of the set bolt 104 is required. This will lower the working efficiency, leading to deterioration of the productivity. Furthermore, when the probe 103 is subjected to an overload during welding process, excessive tightening of the set screw 104 may occur. The over-tightening makes it difficult to remove the set screw when the probe is to be replaced.

Concurrently with a demand for increased productively, there is a need for a friction stir welding tool which is capable of preventing loosening and over-tightening of a set bolt.

PRIOR ART LITERATURE

Patent Documents

[Patent Document 1] Japanese Patent Application Laid-open Publication (JP-A No. 2008-36664

SUMMARY OF INVENTION

Technical Problem

An object of the present invention is to provide a friction stir welding tool which is capable of preventing loosening and over-tightening of a set bolt.

Solution to Problem

In the invention according to a first aspect, there is provided a friction stir welding tool for joining materials to be joined by rotating a pin part at a high speed to generate frictional heat to thereby cause plastic flow in the materials to be joined, the tool comprising: a probe having the pin part at a distal end thereof, the probe having, at a base portion thereof, probe-side protrusions, probe-side recesses, and a female screw part; a columnar holder having, at a distal end thereof, holder-side recesses and holder-side protrusions, respectively; fitted with the probe-side protrusions and the probe-side recesses, the holder further having a through-hole extending along a center axis thereof and a bolt inserted through the through-hole and having a male screw part at a distal end thereof, the male screw part being threaded into the female screw part to thereby retain the probe on the distal end of the holder.

In the invention according to a second aspect, preferably, the friction stir welding tool further comprises a hollow knock pin interposed between the distal end of the holder and the base portion of the probe, wherein the probe has a center axis aligned with the center axis of the holder via the knock pin.

In the invention according to a third aspect, preferably, the probe is made of a material having a higher tempering temperature than a material of the holder.

In the invention according to a fourth aspect, preferably, the material having a higher tempering temperature is an nickel-based alloy

Advantageous Effects of Invention

In the invention according to the first aspect, an external force applied to the probe is transmitted from the probe-side protrusions to the holder-side recesses and from the probe-side recesses to the holder-side protrusions. This means that the external force applied to the probe is hardly transmitted to the bolt. Thus, loosening or over-tightening of screw coupling does not take place.

In the invention according to the second aspect, the center axis of the holder is aligned with the center axis of the probe via the knock pin. During replacement, the probe is centered with respect to the holder by means of the knock pin. The probe replacement work can be achieved with ease and increased efficiency.

In the invention according to the third aspect, the probe is made of a material having a higher tempering temperature than a material of the holder. The probe becomes a high temperature during use. However, by using such a material having a high tempering temperature for the probe, service life of the probe can be extended and replacement frequency of the probe can be reduced, which will lead to increased productivity. On the other hand, the holder does not become a high temperature as compared to the probe. The holder is, therefore, made of a material having a relatively low tempering temperature. This will provide a reduction in material cost of the holder.

In the invention according to the fourth aspect, the material having a higher tempering temperature employs a nickel-based alloy. A cobalt-based alloy may be employed as a material having a higher tempering temperature, however, the nickel-based alloy is advantageous for its longer service life than the cobalt-based alloy.

BRIEF DESCRIPTION OF DRAWINGS

FIG. 1 is an exploded view of a friction stir welding tool according to the present invention;

FIG. 2 is an enlarged perspective view of a distal end portion of the friction stir welding tool shown in FIG. 1;

FIG. 3(*b*) is a view in the direction of arrow of the 3*b*-3*b* line of FIG. 2;

DESCRIPTION OF EMBODIMENTS

Figure 3A:
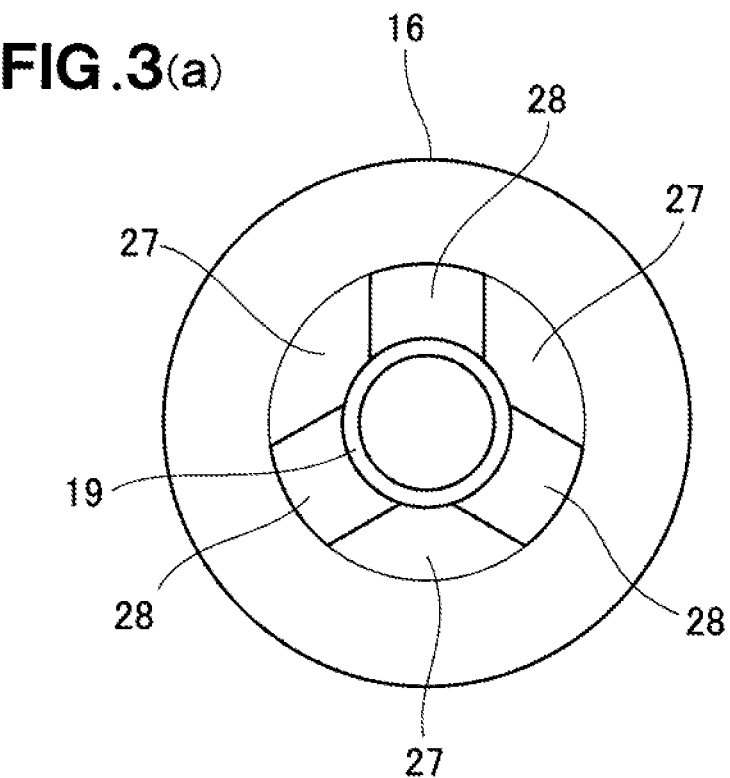
FIG. 3(*a*) is a view in the direction of arrow of the 3*a*-3*a* line of FIG. 2.

A certain preferred embodiment of the present invention will be described below in greater detail with reference to the accompanying sheets of drawings.

Embodiment

As shown in FIG. 1, a friction stir welding tool 10 is comprised of: a probe 13 having a pin part 11 at a distal end thereof, and a female screw part 12 at a base portion thereof a columnar holder 16 having a through-hole 15 along a center axis thereof; a bolt 18 inserted through the through-hole 15 and having, at a distal end thereof, a male screw part 17 threaded or screwed into the female screw part 12; and a hollow knock pin 19 interposed between a distal end of the holder 16 and the base portion of the probe 13.

The knock pin 19 has an outside diameter finished precisely. The to holder 16 has a holder-side pin-receiving part 21 at the distal end thereof. The holder-side pin-receiving part 21 is precisely finished so as to correspond to the precisely finished outside diameter of the knock pin 19. The probe 13 has a probe-side pin-receiving part 22 at the base portion thereof. The probe-side pin-receiving part 22 is precisely finished so as to correspond to the precisely finished outside diameter of the knock pin 19.

When the knock pin 19 is fitted in the holder-side pin-receiving part 21, a center axis of the knock pin 19 is properly aligned with the center axis of the holder 16. Then, the probe-side pin-receiving part 22 is fitted with the knock pin 19 whereupon a center axis of the probe 13 is properly aligned with the center axis of the knock pin 19. Thus, the center axis of the probe 13 is properly aligned with the center axis of the holder 16 via the knock pin 19.

The probe 16, the holder 16, the bolt 18 and the knock pin 19 are separate parts structurally independent from one another. Therefore, materials for these parts are mutually and freely selectable. Among these, the probe 13 becomes high temperature through direct contact between the pin part 11 and a material 32 to be joined (FIG. 5) and, hence, a high tempering temperature is essential for the probe 13. The reason is as follows.

Tempering is a kind of heat treatment which is performed to impart toughness or the like property to a brittle steel. A suitable tempering temperature is set for each material. If tempering is done at a temperature other than the suitable tempering temperature, tempering brittleness will occur and the risk of brittle fracture increases.

When aluminum alloy sheets are mutually welded together, a joint portion becomes a temperature of 400 to 500° C. It is believed, however, that when the pin part is plunged into the material to be joined, the temperature temporarily exceeds the range specified above. Given that a suitable tempering temperature for the probe is 560° C., and the temperature of the probe may temporarily exceed 560° C. when the pin part is plunged into the material to be joined, it may occur that the probe reaches an undesirably elevated temperature and is thereby tempered. Thus, the risk of probe mechanical breakdown increases.

If the probe is made of a material of high tempering temperature such as 550° C., preferably above 560 t, tempering does not takes place, and there is no need to worry about the occurrence of tempering at an undesirably elevated temperature. The probe is, therefore, desired to be made of a material having a higher tempering temperature than a material of the holder.

The holder 16 and the knock pin 19 are relatively low in temperature and they are allowed to be made of a material of relatively low grade.

The probe 13 requires a high tempering temperature and is preferably made of nickel-based alloys and cobalt-based alloys. However, according to the experiments described below, the nickel-based alloys are superior to the cobalt-based alloys in terms of service life. The holder 16 does not require a high tempering temperature and is preferably made of alloy tool steels. The bolt 18 is preferably made of austenitic stainless steels having high heat resistance. The knock pin 19 is preferably made of martensitic stainless steels.

As shown in FIG. 2, the probe 13 has the pin part 11 at the distal end thereof. At the base portion (rear end) thereof, the probe 13 has a plurality of probe-side protrusions 24 and a plurality of probe-side recesses 25. Similarly, at the distal end thereof, the holder 16 has a plurality of holder side recesses 27 that are configured to fit with the probe-side protrusions 24, and a plurality of holder-side protrusions 28 that are configured to fit with the probe-side recesses 25.

Figure 3B:
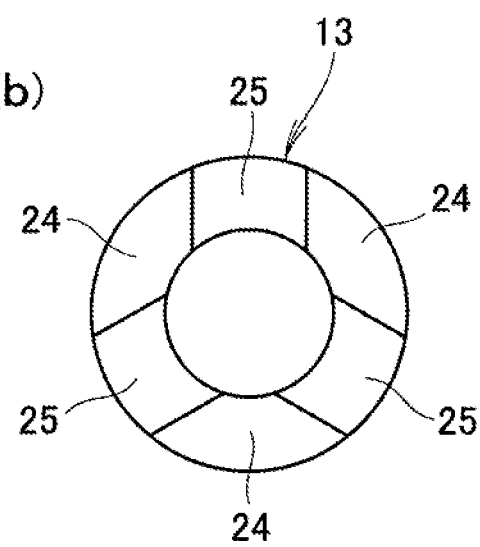

As shown in FIG. 3(*a*), the holder 16 has three linear holder-side protrusions 28 and three sectorial holder-side recesses 27. The holder-side protrusions 28 are provided at regular intervals with 120° pitch. The holder-side recesses 27 are each provided between one pair of adjacent holder-side protrusions 28.

As shown in FIG. 3(*b*), the probe 13 has three linear probe-side recesses 25, and three sectorial probe-side protrusions 24. The probe-side recesses 25 are provided at regular intervals with 120° pitch. The probe-side protrusions 24 are each provided between one pair of adjacent probe-side recesses 25. The linear holder-side protrusions 28 and the linear probe-side recesses 25 are fitted with each other, and the sectorial holder-side recesses 27 and the sectorial probe-side protrusions 24 are fitted with each other.

Although in the illustrated embodiment, the number of the protrusions 25; 28 and the number of the recesses 24; 27 are three, two or more than four protrusions or recesses may be used. However, to avoid resonance caused by the rotation, an odd number, such as 3, 5 or 7 is desired for the protrusions and recesses. 3 is the minimum value of odd number (excluding 1). Machining cost is affected by the number of protrusions and recesses and, hence, 3 is optimal. It is also possible to reverse the relation between the protrusions and the recesses such that the holder-side protrusions 28 are replaced with recesses and the probe-side recesses 25 are replaced with protrusions.

As shown in FIG. 2, after mounting the probe 13 to the holder 16, a rotational force applied to the probe 13 is retained or born by the abutment between sidewalls 27*a* of the respective probe-side protrusions 24 and mating sidewalls 27*a* of the respective holder-side recesses 27. Furthermore, an axial force applied to the probe 13 is retained or born by the abutment between front surfaces 24*b* of the respective probe-side protrusions 24 and bottom surfaces 27*b* of the respective holder-side recesses 27.

Figure 4:
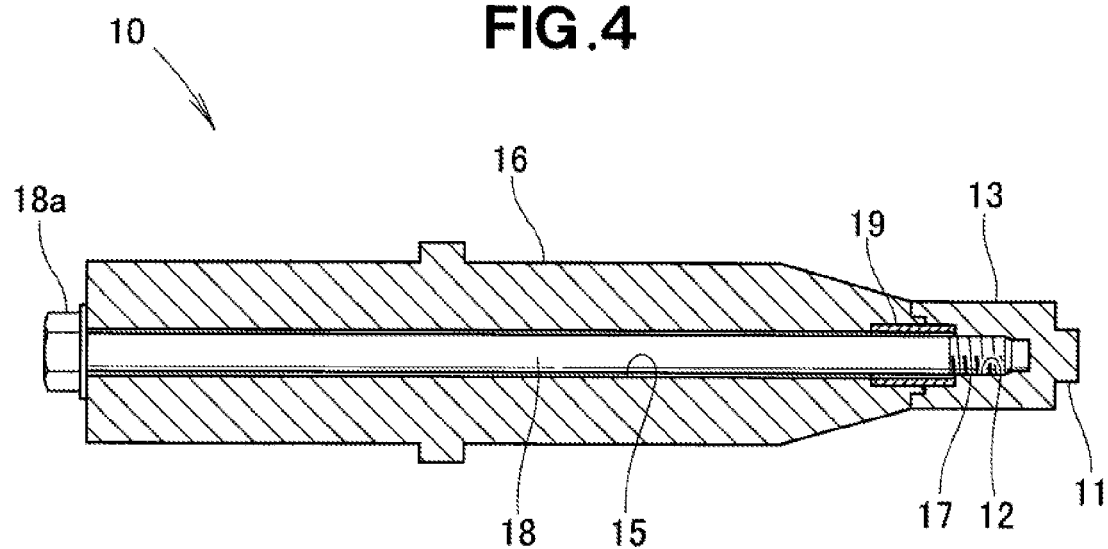
FIG. 4 is a cross-sectional view of the friction stir welding tool shown in FIG. 1.

With the probe-side protrusions 24 and recesses 25 being fitted with the holder side recesses 27 and protrusions 28, respectively, the bolt 18 is inserted through the through-hole 15 of the holder 16 and the male screw part 17 at the distal end of the bolt 18 is screwed into the female screw part 12 of the probe 13, as shown in FIG. 4. A head 18*a* of the bolt 18 is in abutment with a rear end of the holder 16. Thus, the probe 13 is firmly and reliably set on the holder 16 without detachment.

Next, the principle of the friction stir welding method will be described with reference to FIG. 5.

Figure 5:
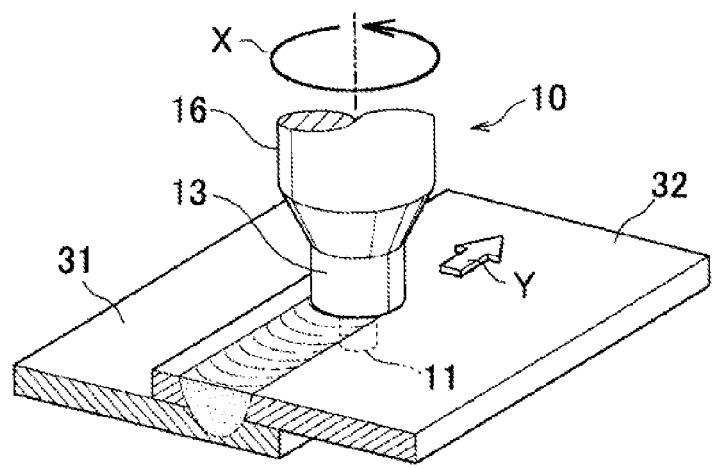
FIG. 5 is a view illustrative of the operation of the friction stir welding tool.

As shown in FIG. 5, the material 32 to be joined is lapped over a material 31 to be joined. Then, the holder 16 and the probe 13 are rotated at a high speed in a direction, for example, indicated by the arrow X. Heat generated by friction between the pin part 11 and the materials 31, 32 to be joined causes melting at a part of the materials 31, 32. The pin part 11 is now allowed to plunge into the materials 31, 32 to be joined and molten metal is stirred and homogenized by the rotating pin part 11. By moving the pin part 11 in a direction indicated by the arrow Y while rotating the holder 16 and the probe 13, the materials 31 and 32 are joined or welded together.

During welding, as previously described with reference to FIG. 2, the rotational force applied to the probe 13 is retained or born by abutment between the sidewalls 24a of the probe-side protrusions 24 and the mating sidewalls 27a of the holder-side recesses 27, and the axial force applied to the probe 13 is retained or born by the abutment between the front surfaces 24b of the probe-side protrusions 24 and the bottom surfaces 27b of the holder-side recesses 27. Thus, external forces (including the axial force and the rotational force) hardly act on the bolt 18 shown in FIG. 3.

The probe 13 wears away as it is in contact with the materials 31, 32 to be joined at high temperatures as shown in FIG. 5. It, is therefore necessary to replace the existing probe 13 with a new probe when the service life of the existing probe 13 runs out. A probe replacement procedure will be described below with reference to FIG. 6.

Figure 6A:
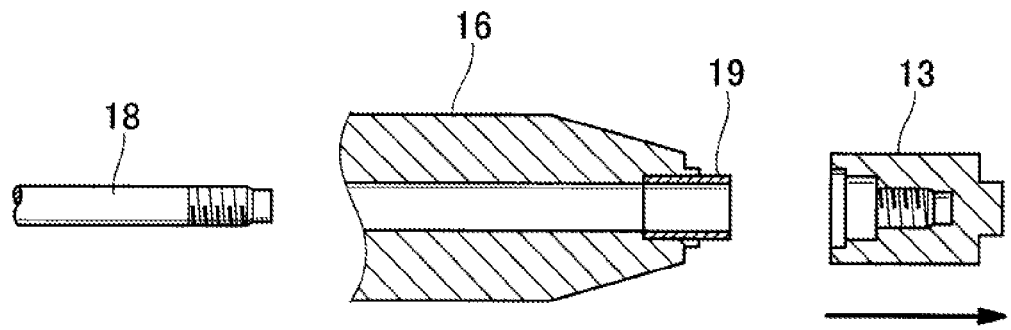
FIG. 6 is view showing a probe exchange procedure.

As shown in FIG. 6(a), the bolt 18 is removed from the holder 16. Then, the used probe 13 is detached from the holder 16. In this instance, the used probe 13 can be easily separated from the holder 16 because they are coupled together merely by way of fitting engagement between the probe-side protrusions 24 and recesses 25, respectively, with the holder-side recesses 27 and protrusions 28, as shown in FIG. 3.

Figure 6B:
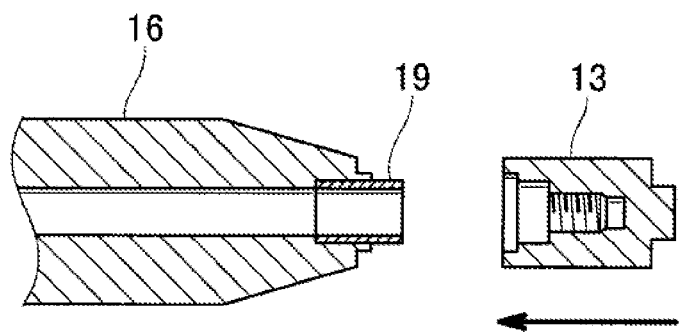
Figure 6C:
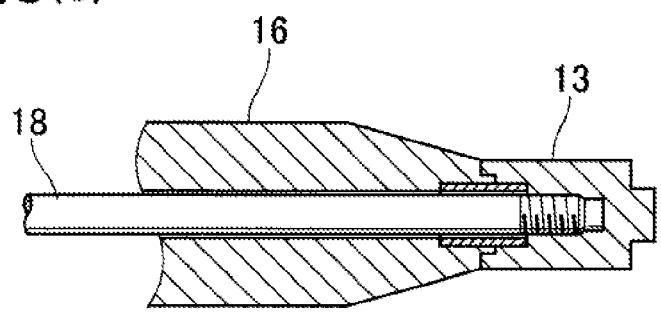

Next, as shown in FIG. 6(b), a new probe 13 is coupled with the holder 16. In this instance, the new probe 13 can be easily set on the holder 16 because they can be coupled together merely by way of fitting engagement between probe-side protrusions 24 and recesses 25 of the new probe 13 and the holder-side recesses 27 and protrusions 28 of the holder 16, respectively, as will be understood from FIG. 3. Then, as shown in FIG. 6(c), the probe 13 is firmly secured to the holder 16 by the bolt 18 against detachment.

As shown in FIG. 6(b), simply by fitting the probe 13 with the knock pin 19, the center axis of the probe 13 can be aligned with the center axis of the holder 18. The knock pin 19 can be omitted by integrally forming a cylindrical protrusion at the tip of the holder 16. However, considering that the cylindrical protrusion should be formed by a different material from the holder 16, the knock pin 19 used in the illustrated embodiment is recommended.

Next, experimental examples of the present invention will be described. The present invention should by no means be limited to the experimental examples, Experimental Examples Common Conditions Test Piece:
A piece of aluminum alloy (JIS ADC3 equivalent) having a length of 300 mm, a width of 100 mm and a thickness of 3 mm was placed over a 270 MPa-class GA-plated steel sheet, and welding was performed under the following conditions.
Probe Rotating Speed: 1,000 rpm
Probe Feed Speed: 500 mm/min
Probe Down Force: 1,000-1,500 kN
Holder Material: DAC55 (JIS-SKD61 (Alloy Tool Steel) modified) manufactured by Hitachi Metal Tool Steel Ltd.
Fastener: SUS304 bolt
Knock Pin Material: SUS420
Probe:
Pin Part Size: 7 mm in diameter and 3.2 mm in length
Material:
For Experiment 01, a probe made of high-hardness high-speed tool steel was prepared.
For Experiment 02, a probe made of cobalt-based alloy was prepared in expectation of heat-resistance and high-temperature strength.
For Experiment 03, a probe made of high heat-resistant, high creep-resistant nickel-based alloy was prepared. Detailed chemical compositions (% by weight) are shown in Table 1 below.
Experiment Items:
A joint length achieved before a 10% wear in length of the pin part was found, or a joint length achieved before the pin part was broken.
Evaluation was made by a shorter one of the joint lengths with the results shown in Table 1 below.

TABLE 1

| | Probe material | C | Si | Mn | P | S | Cr | Mo | W | V |
|---|---|---|---|---|---|---|---|---|---|---|
| Experiment 01 | JIS-SKH51 | 0.80~0.90 | ≤0.40 | ≤0.40 | ≤0.030 | ≤0.030 | 3.80~4.50 | 4.50~5.50 | 5.50~6.70 | 1.60~2.20 |

| | Probe material | | | Fe | | Tempering temperature | | Hardness | Joint length | Breakage |
|---|---|---|---|---|---|---|---|---|---|---|
| Experiment 01 | JIS-SKH51 | | | Bal | | 550-580° C. | | HRC64 | 12.0 m | No |

| | Probe material | C | Cr | W | Mo | V | Co | Fe | Tempering temperature | Hardness | Joint length | Breakage |
|---|---|---|---|---|---|---|---|---|---|---|---|---|
| Experiment 02 | Hitachi Metal Precision Ltd. | 2.6 | 28.0 | 12.0 | — | — | Bal | — | 830° C. | HRC55 | 2.91 m | Yes |

TABLE 1-continued

HST-1

| | Probe material | Al | Ni | Co | Cr | Zr | W | Mo | C | Ta | Ti | B | Tempering temperature | Hardness | Joint length | Breakage |
|---|---|---|---|---|---|---|---|---|---|---|---|---|---|---|---|---|
| Experiment 03 | Hitachi Metal Precision Ltd. MM246 | 5.5 | Bal | 10 | 9 | 0.05 | 10 | 2.5 | 0.15 | 1.5 | 1.5 | 0.015 | 630° C. | HRC40 | 21.2 m | No |

Figure 7:
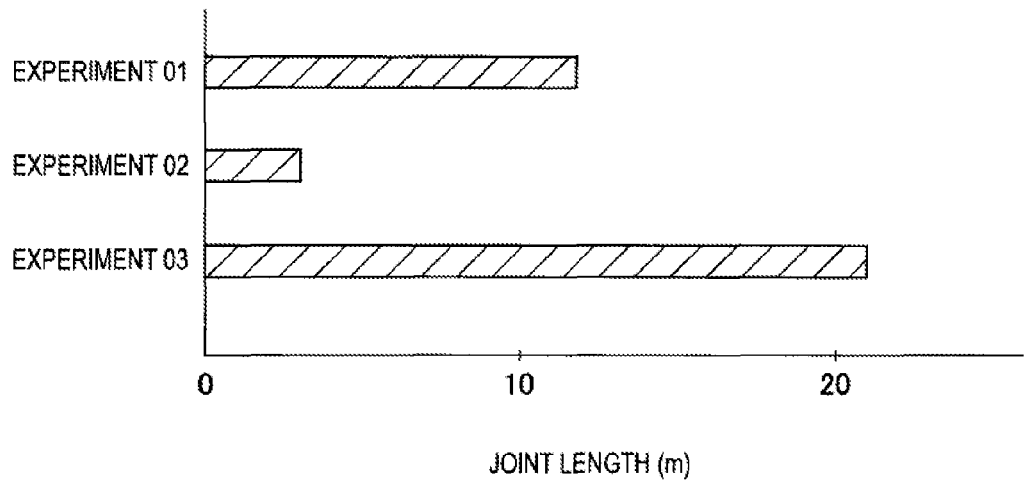
FIG. 7 is a graph showing, for comparison, weld lengths obtained by experiments.
Figure 8:
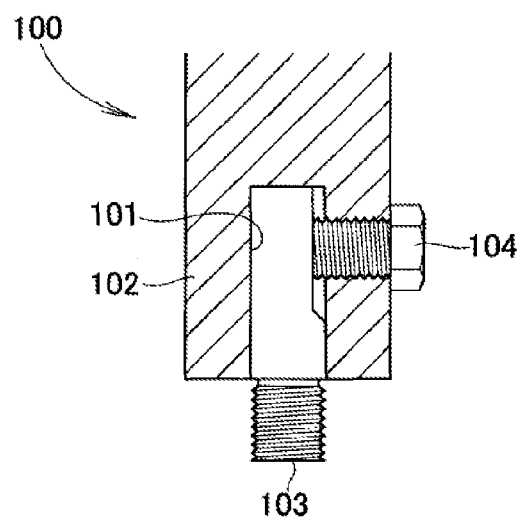
FIG. 8 is a cross-sectional view of a conventional friction stir welding tool.

The joint lengths shown in Table 1 are graphically shown in FIG. 7.

In Experiment 01 (high-speed tool steel), a 12.0-m-length joint was formed before the wear of the pin part reached 10%.

In Experiment 02 (cobalt-based alloy), due to breakage of the pin part, the joint length was limited up to 2.91 m.

In Experiment 03, a 21.2-m-length joint was formed before the wear of the pin part reached 10%.

Materials eligible for the probe may include high-speed tool steels, cobalt-base alloys, nickel-based alloys, and any other similar alloys. However, considering a requirement that the material should have a higher tempering temperature than a material of the holder (having a tempering temperature of about 560° C.), the cobalt-based alloys (having a tempering temperature of 830° C.) and the nickel-based alloys (having a tempering temperature of 630° C.) are preferable. Furthermore, in view of the experimental results discussed above, the nickel-based alloys are recommended.

INDUSTRIAL APPLICABILITY

The friction stir welding tool according to the present invention is suitable for use in lap welding of aluminum alloy sheets and also in lap welding of an aluminum alloy and an iron-based material.

REFERENCE SIGNS LIST

10: friction stir welding tool
11: pin part
12: female screw part
13: probe
15: through-hole
16: holder
17: male screw part
18: bolt
19: knock pin
24: probe-side protrusion
25: probe-side recess
27: holder-side recess
28: holder-side protrusion
31, 32: material to be joined

The invention claimed is:

1. A friction stir welding tool for joining materials to be joined by rotating a pin part at a speed to generate frictional heat to thereby cause plastic flow in the materials to be joined, the tool comprising:
    a probe having the pin part at a distal end thereof, the probe having, at a base portion thereof, probe-side protrusions, probe-side recesses, and a female screw part;
    a columnar holder having, at a distal end thereof, holder-side recesses and holder-side protrusions, respectively, fitted with the probe-side protrusions and the probe-side recesses, the holder further having a through-hole extending along a center axis thereof; and
    a bolt inserted through the through-hole and having a male screw part at a distal end thereof, the male screw part being threaded into the female screw part to thereby retain the probe on the distal end of the holder.

2. The friction stir welding tool as defined in claim 1, further comprising a hollow knock pin interposed between the distal end of the holder and the base portion of the probe, wherein the probe has a center axis aligned with the center axis of the holder via the knock pin.

3. The friction stir welding tool as defined in claim 1, wherein the probe is made of a material having a higher tempering temperature than a material of the holder.

4. The friction stir welding tool as defined in claim 3, wherein the material having a higher tempering temperature is a nickel-based alloy.

* * * * *